US012007256B2

(12) United States Patent
Rizzi

(10) Patent No.: US 12,007,256 B2
(45) Date of Patent: Jun. 11, 2024

(54) MAGNET HOLDER AND STROKE SENSOR WITH THE MAGNET HOLDER

(71) Applicant: KNORR-BREMSE Systeme fuer Nutzfahrzeuge GmbH, Munich (DE)

(72) Inventor: Stefano Rizzi, Lissone (IT)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 495 days.

(21) Appl. No.: 17/270,790

(22) PCT Filed: Aug. 27, 2019

(86) PCT No.: PCT/EP2019/072774
§ 371 (c)(1),
(2) Date: Feb. 23, 2021

(87) PCT Pub. No.: WO2020/048818
PCT Pub. Date: Mar. 12, 2020

(65) Prior Publication Data
US 2021/0348948 A1    Nov. 11, 2021

(30) Foreign Application Priority Data

Sep. 6, 2018  (EP) ..................................... 18193005

(51) Int. Cl.
*B60T 7/04*     (2006.01)
*F16D 66/00*    (2006.01)
(Continued)

(52) U.S. Cl.
CPC ................ *G01D 5/16* (2013.01); *B60T 7/042* (2013.01); *F16D 66/00* (2013.01); *G01D 5/145* (2013.01);
(Continued)

(58) Field of Classification Search
CPC ...... B60T 7/042; B60T 15/14; B60T 2220/04; G01D 5/16; G01D 5/145
See application file for complete search history.

(56) References Cited

U.S. PATENT DOCUMENTS 9,266,517 B2     2/2016  Knechtges et al.
10,059,319 B2 *  8/2018  Drumm ................... B60T 7/042
(Continued)

FOREIGN PATENT DOCUMENTS

CN     1767974 A     5/2006
CN     1890141 A     1/2007
(Continued)

OTHER PUBLICATIONS

Machine translation of DE 102016005377 (no date).*
(Continued)

*Primary Examiner* — Nicholas J Lane
(74) *Attorney, Agent, or Firm* — NORTON ROSE FULBRIGHT US LLP; Gerard A. Messina

(57) ABSTRACT

A magnet holder for a stroke sensor in which the stroke sensor comprises a magneto-resistive sensor with a magnet and is configured to sense a linear displacement of a plunger in a cylindrical body of a plunger/cylinder arrangement. The magnet holder includes a sleeve enveloping the plunger; a mounting for the magnet radially protruding from the sleeve; and a cover for closing the sleeve on one side comprising an opening for allowing the linear displacement of the plunger. The sleeve and the cover move relative to each other, when the plunger performs the linear displacement in the cylindrical body.

13 Claims, 3 Drawing Sheets

(51) Int. Cl.
  *G01D 5/14* (2006.01)
  *G01D 5/16* (2006.01)
  *G01D 11/24* (2006.01)
  *F16D 121/04* (2012.01)

(52) U.S. Cl.
  CPC ...... *G01D 11/245* (2013.01); *F16D 2066/003* (2013.01); *F16D 2121/04* (2013.01)

(56) References Cited

U.S. PATENT DOCUMENTS

| | | | |
|---|---|---|---|
| 2003/0172651 | A1 | 9/2003 | Zehnder et al. |
| 2004/0164611 | A1 | 8/2004 | Masson et al. |
| 2008/0074010 | A1 | 3/2008 | Jungmayr et al. |
| 2009/0261818 | A1 | 10/2009 | Gronau et al. |
| 2013/0205881 | A1 | 8/2013 | Naether et al. |
| 2014/0144223 | A1 | 5/2014 | Knechtges et al. |
| 2014/0331758 | A1* | 11/2014 | Sim ................. G01L 5/28 73/132 |
| 2015/0033839 | A1 | 2/2015 | Voigtmann et al. |
| 2016/0144836 | A1 | 5/2016 | Mayr et al. |
| 2016/0264114 | A1* | 9/2016 | Maruo ............. B60T 13/662 |
| 2016/0272184 | A1 | 9/2016 | Zhang |
| 2016/0368415 | A1* | 12/2016 | Shiwa .............. B60Q 1/44 |
| 2017/0190324 | A1* | 7/2017 | Huber .............. G05G 1/30 |
| 2018/0162330 | A1 | 6/2018 | Odaira et al. |
| 2019/0039590 | A1* | 2/2019 | Maruo ............. B60T 8/4081 |
| 2019/0232928 | A1* | 8/2019 | Adachi ............ B60T 11/18 |
| 2022/0055582 | A1* | 2/2022 | Takimoto ......... B60T 13/686 |
| 2023/0192059 | A1* | 6/2023 | Roether ........... B60T 17/08 188/72.4 |

FOREIGN PATENT DOCUMENTS

| | | |
|---|---|---|
| CN | 101089406 A | 12/2007 |
| CN | 101952689 A | 1/2011 |
| CN | 101960262 A | 1/2011 |
| CN | 102026853 A | 4/2011 |
| CN | 102197234 A | 9/2011 |
| CN | 102470850 A | 5/2012 |
| CN | 102753942 A | 10/2012 |
| CN | 103097197 A | 5/2013 |
| CN | 103707869 A | 4/2014 |
| CN | 103802814 A | 5/2014 |
| CN | 104279205 A | 1/2015 |
| CN | 104797470 A | 7/2015 |
| CN | 105711566 A | 6/2016 |
| CN | 106762960 A | 5/2017 |
| CN | 107949507 A | 4/2018 |
| DE | 19637296 A1 | 3/1998 |
| DE | 102006034594 A1 | 2/2008 |
| DE | 102008052416 A1 | 4/2010 |
| DE | 102012222547 A1 | 6/2013 |
| DE | 102013015973 A1 | 3/2015 |
| DE | 102016005377 A1 * | 11/2017 ............ B60T 11/20 |
| EP | 1008835 A1 | 6/2000 |
| EP | 3032222 A2 | 6/2016 |
| KR | 20170096248 A | 8/2017 |
| KR | 20180074214 A | 7/2018 |
| WO | 2015073431 A1 | 5/2015 |
| WO | 2016012066 A1 | 1/2016 |
| WO | WO-2016012066 A1 * | 1/2016 ............ B60T 13/66 |
| WO | 2016041755 | 3/2016 |
| WO | 2017141725 A1 | 8/2017 |
| WO | 2017190829 A1 | 11/2017 |

OTHER PUBLICATIONS

Machine translation of WO 2016/012066 (no date).*
International Search Report for PCT/EP2019/072774, dated Nov. 12, 2019.
Outline drawing of product No. 4800010000, WABCO.
"EC Type approval certificate", WABCO.

* cited by examiner

A-A

MAGNET HOLDER AND STROKE SENSOR WITH THE MAGNET HOLDER

FIELD OF THE INVENTION

The present invention relates to a magnet holder and a stroke sensor with the magnet holder to determine an axial displacement in a plunger/cylinder arrangement.

BACKGROUND INFORMATION

Electronic braking systems become more and more widespread in commercial vehicles. These systems rely on accurate measurements of driver demands for a brake action. Also, for conventional pneumatic or hydraulic braking systems, there is an increasing demand to determine a brake actuation correctly as intended by the driver of the vehicle. It is thus important to measure accurately axial displacements by stroke sensors, for example of plunger or piston relative to a cylinder.

Patent document DE 196 37 296 A1 discusses a stroke sensor for a piston with a magneto-resistive element arranged in a cylindrical body, wherein the associated magnet is mounted on the piston. Upon an axial displacement of the piston an electric signal is generated in the magneto-resistive element dependent on the axial position of the piston. This sensor is, however, arranged within the cylinder and as such it is exposed to moisture or dirt inside the cylinder. Another sensor module for a master cylinder is discussed in U.S. Pat. No. 9,266,517 B2, which also relies on a magneto-resistive element and includes a corresponding magnet. This sensor module uses a separate sensor chamber in which the magnet is mounted on an end portion of an additional plunger that moves back and forth unisonous with a plunger of the master cylinder whose position shall be sensed. Although this sensor module provides a separate chamber for the magneto-resistive element and is thus less prone to moisture and dirt, the additional plunger as magnet holder with its guiding makes the sensor arrangement more complicated.

Therefore, there is a demand for further magnet holder and stroke sensors that provide a high reliability, are simple to manufacture, and provide accurate sensor results.

At least some of the problems of the conventional systems as described before are overcome by a magnet holder as described herein, a stroke sensor as described herein, and a plunger/cylinder arrangement as described herein. The further descriptions and embodiments refer to further advantageous realizations of the subject matter of the main description and embodiment as described herein.

SUMMARY OF THE INVENTION

The present invention relates to a magnet holder for a stroke sensor. The stroke sensor comprises a magneto-resistive sensor with a magnet and is configured to sense a linear displacement of a plunger in a cylindrical body of a plunger/cylinder arrangement. The magnet holder comprises a sleeve enveloping the plunger, a mounting for the magnet radially protruding from the sleeve, and a cover for closing the sleeve on one side. The cover comprises an opening for allowing the linear displacement of the plunger (e.g. by guiding the plunger rod). The sleeve and the cover move relative to each other, when the plunger performs the linear displacement in the cylindrical body.

The term "enveloping" shall indicate, that the sleeve may encircle the plunger completely around the plunger in a cross-section perpendicular to the axial displacement direction. However, enveloping does not imply that plunger is encircled in the axial direction. Instead, with respect to the axial direction at least part of the plunger (e.g. a plunger rod) may protrude out of the sleeve.

It is understood that the magneto-resistive sensors can be any sensor that generates a sensor signal dependent on a change of a magnet field resulting in a change of a resistance in a sensor element. The change in the magnetic field is caused by the axial displacement of the magnet relative to the magneto-resistive sensor. Examples for such magneto-resistive sensors uses the Hall-effect, GMR—(giant magneto-resistance), AMR—(anisotropic magneto-resistance), TMR—(tunnel magneto-resistance) effect to generate respective sensor signals. The corresponding Hall-sensor does not need magnet material, whereas the corresponding GMR-, TMR-, AMR-sensor rely at least in part on magnetic materials. The present invention shall not be limited on a particular example for the magneto-resistive sensor.

Optionally the plunger/cylinder arrangement comprises a piston configured to move together with the plunger inside the cylindrical body. In this embodiment, the sleeve may be formed to envelope at least an upper portion of the piston. The piston and the plunger are, however, separate elements which are detachable from one another.

The plunger may perform a rotation and the linear displacement relative to the cylindrical body. In this case, the mounting may form together with the sleeve an integral part and may be configured to provide a rotational interlock between the sleeve and the cylindrical body, while allowing the linear displacement (linear movement) within the cylindrical body. The rotational interlock may be proved by an axial slot (elongated/linear opening) within the cylindrical body and the sleeve may comprise a pin that engages to the axial slot and prevents the relative rotation. The mounting of the magnet holder may act as such a pin. As a result of this interlocking engagement the magnet will move linearly relative to the magneto-resistive sensor and thus provides a well-defined sensor signal.

Optionally the sleeve is adapted to perform the linear displacement together with the plunger and/or the piston. This may likewise be implemented by a pin/groove engagement between the sleeve and the plunger. A pin/groove engagement may likewise be formed between the sleeve the piston.

The present invention relates also to a stroke sensor comprising a magneto-resistive sensor with a magnet, which may be a Hall sensor and is configured to sense a linear displacement of a plunger in a cylindrical body. The stroke sensor includes a magnet holder as described before.

Optionally, the stroke sensor includes a chamber arranged at a side portion of the cylindrical body and sealed from an interior space of the cylindrical body. Moreover, the stroke sensor may include a removable side cover that provides a closure for the chamber. The magneto-resistive sensor may be arranged together with its magnet inside the chamber. The cover may be adapted to close the cylindrical body and the chamber.

Optionally, a printed circuit board is attached to the removable side cover, wherein the printed circuit boards holds the magneto-resistive sensor in the chamber.

The present invention relates also to a plunger/cylinder arrangement for a brake system of a vehicle, in particular a commercial vehicle. The plunger/cylinder arrangement includes a cylindrical body, a plunger, and a stroke sensor as described before. The plunger is able to perform a linear displacement in the cylindrical body, which may correspond to a brake demand. The stroke sensor may sense this brake demand for the vehicle.

Optionally, the cylindrical body comprises an axial slot (split-like opening) for receiving part of the mounting to provide an axial guidance for the sleeve while preventing relative rotations between the sleeve and the cylindrical body.

Optionally, the plunger/cylinder arrangement includes a piston configured to move in at least one direction together with the plunger inside the cylindrical body, wherein the sleeve is adapted to slide inside the cylindrical body and to encircle at least an upper portion of the piston. Furthermore, a sealing between a lower portion of the piston and the cylindrical body may be provided to seal the chamber from an interior space of the cylindrical body. Hence, this arrangement provides a secure protection the magneto-resistive sensor in the chamber, e.g. from moisture, dirt etc., without needing addition elements like additional plungers as in the conventional arrangements.

Embodiments of the present invention relates also to a vehicle with the plunger/cylinder arrangement as described before. The vehicle may be a commercial vehicle and the plunger/cylinder arrangement may be part of a braking system of the vehicle.

Some examples of the systems will be described in the following by way of examples only, and with respect to the accompanying figures.

DETAILED DESCRIPTION

Figure 1A:
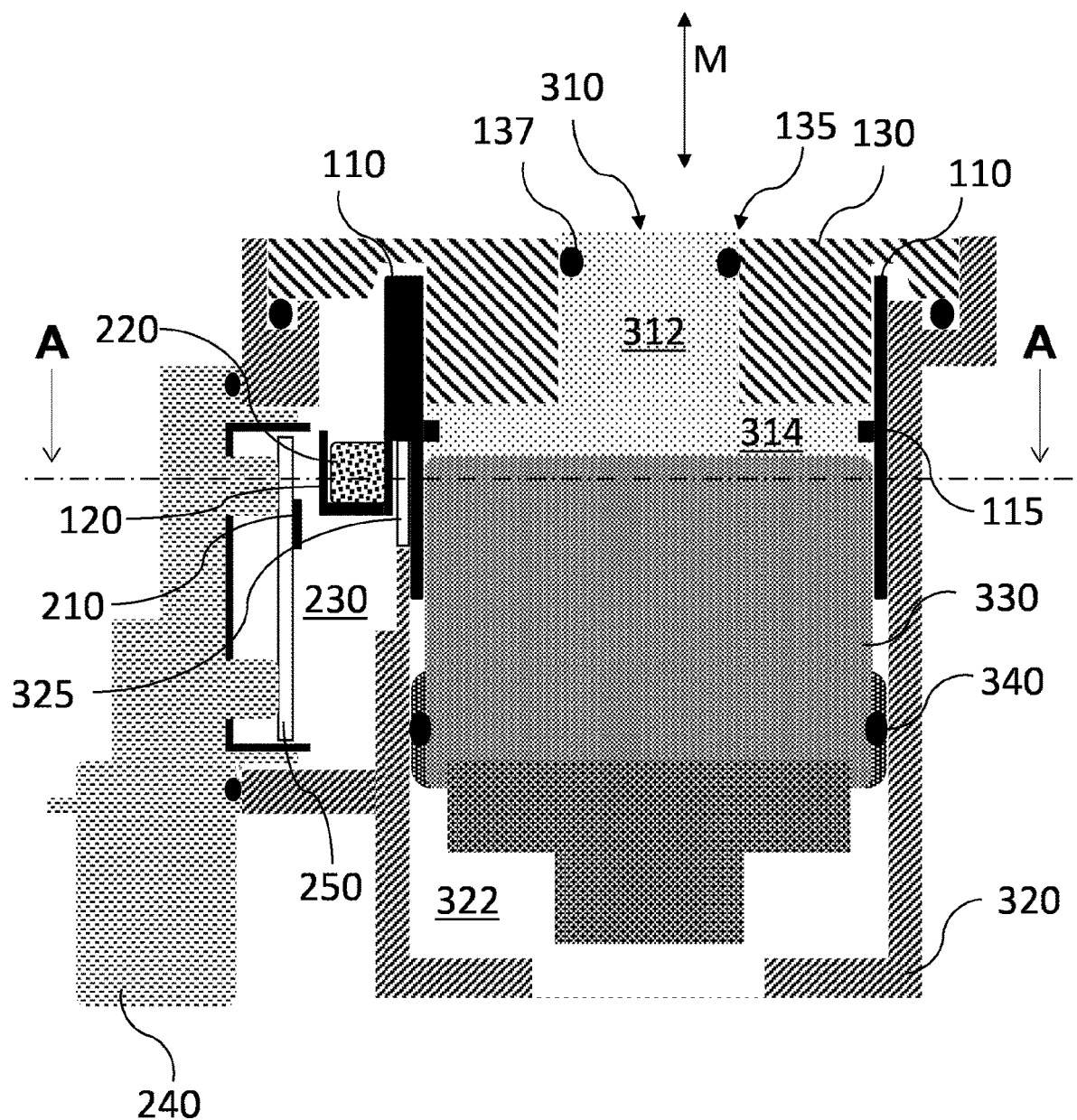
FIG. 1A and FIG. 1B depicts a magnet holder with a stroke sensor for a plunger/cylinder arrangement system according to an embodiment of the present invention.
Figure 1B:
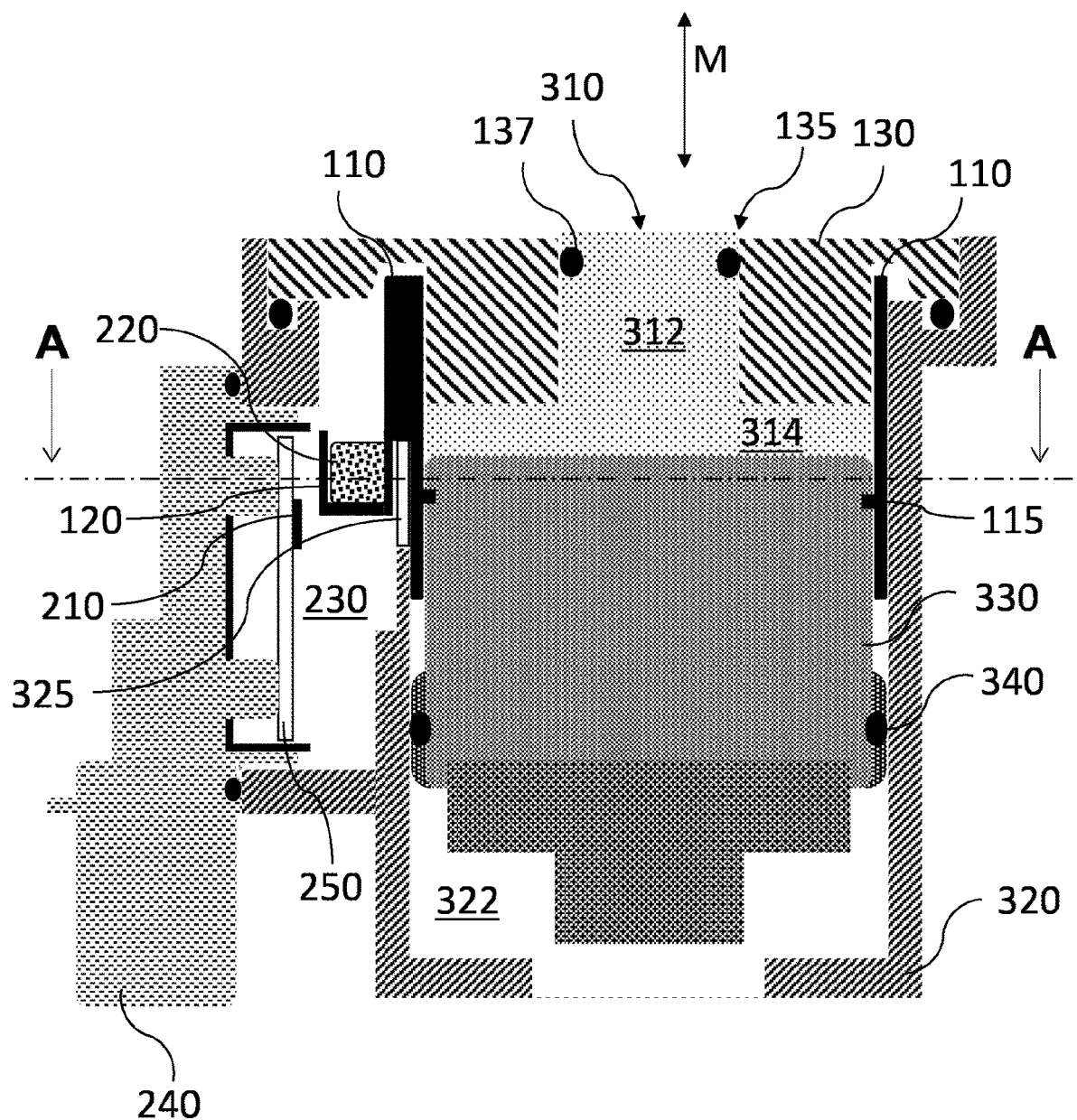

FIG. 1A and FIG. 1B depict a magnet holder with a stroke sensor for a plunger/cylinder arrangement. The stroke sensor comprises a magneto-resistive sensor 210 with a magnet 220 and the plunger/cylinder arrangement comprises a plunger 310 and a cylindrical body 320 that can move relative to each other along the axial direction M (linear displacement). The magnet holder comprises a sleeve 110 encircling the plunger 310, a mounting 120 for the magnet 220 protruding radially outward from the sleeve 110, and a cover 130 for closing the sleeve 110 on one side. The cover 130 has an opening 135 for allowing the linear displacement of the plunger 310 therethrough. More precisely, the plunger 310 may comprise a plunger rod 312 extending through the opening 135 and a piston part 314 (broadened portion) arranged in an interior space 322 of the cylindrical body 320. The sleeve 110 and the cover 130 move relative to each other, when the plunger 310 performs the linear displacement M through the interior space 322 of the cylindrical body 320.

In the embodiment of FIG. 1A, the plunger 310 abuts to a piston 330 to push the piston 330 upon the linear displacement M. The plunger/cylinder arrangement may further include at least one spring (not shown in FIG. 1A) to provide a bias force pressing the piston 330 to the plunger 310 (in FIG. 1A upward). It is also possible that the piston 330 couples to the plunger 310 via other coupling elements (e.g. a snap or click connection). The plunger 310 couples likewise to the sleeve 110 preventing a relative displacement of the sleeve 110 and the plunger 310 in the axial direction M. The sleeve 110 may be coupled to the piston 330 rather than to the plunger 310. However, the plunger 310 and the sleeve 110 may rotate relative to each other about the axial direction M. This coupling may be implemented by groove/pin coupling 115 involving e.g. protrusions or a protruding ring extending radially inwards from the sleeve 110 and corresponding recesses or grooves formed at an outer circumference of the plunger 310 or of the piston 330 (or its broadened portion). It may also be implemented the other way around, i.e. the groove/recess is formed in the sleeve 110 and the protrusion(s) on the plunger 310.

The embodiment depicted in FIG. 1B differs from the embodiment in FIG. 1A only in that the groove/pin coupling 115 involves now the sleeve 110 and the piston 330 (not the plunger). All other components may be arranged in the same way.

The mounting 120 for the magnet 220 extends radially outwards from the sleeve 110 such that the magnet 220 is held within a chamber 230 separate from the interior space 322 of the cylindrical body 320. The chamber 230 is formed at a side portion of the cylindrical body 320 and is covered by a removable side cover 240. The magneto-resistive sensor 210 is arranged together with the magnet 220 inside the chamber 230, which is sealed from the interior space 322 of the cylindrical body 320 by a sealing arrangement/structure 340 (e.g. a sealing ring). The magneto-resistive sensor 210 may be arranged on a printed circuit board 250 that in turn may be attached to the removable side cover 240 of the chamber 230.

The cover 130 is adapted to provide a closure for the cylindrical body 320 and the sleeve 110 and/or the chamber 230. The cover 130 is mounted on the cylindrical body 320 and comprises the opening 135 through which the piston rod 312 extends and moves along the linear direction M. Optional sealing elements 137 may be formed between the cover 130 and the piston 310 to provide a sealing during the linear motion M (displacement).

Figure 2:
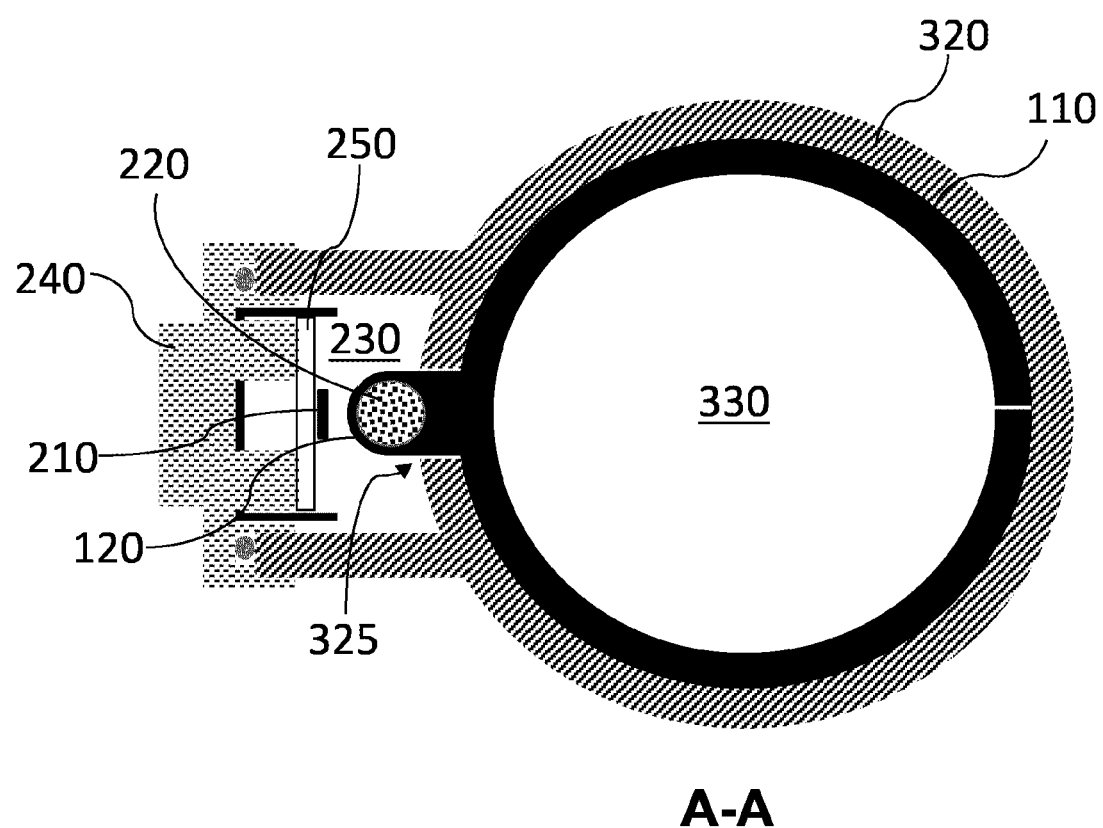
FIG. 2 shows a cross-section view of the stroke sensor of FIG. 1A or FIG. 1B along the cross-sectional line A-A.

FIG. 2 shows a cross-sectional view along the cross-sectional line A-A through the piston 330, the sleeve 110, the cylindrical body 320, the magnet 220, and the side cover 240 with the circuit board 250.

As it is apparent from the cross-sectional view, the sleeve 110 extends through a slot 325 of the cylindrical body 320. This engagement provides a rotational fixation of the sleeve 110 relative to the cylindrical body 320 so that the sleeve 110 is prevented from rotating relative to the cylindrical body 320. As a result, the magnet 120 has to remain at the same angular position in FIG. 2 (the axial displacement M is perpendicular to the drawing plane in FIG. 2). Thus, sensor signals generated by the magneto-resistive element 210 remains in the linear operation range (the linearity is maintained).

Advantageous aspects of embodiments can be summarized as follows:

The described arrangement provides a stroke sensor based, e.g., on Hall effect technology for the purpose to provide electrical signal proportional to a stroke of the plunger 310. The sensor is sensitive to magnetic field variation therefore a permanent magnet 220 is placed near the core element of the sensor (e.g. a Hall chip 210), and properly guided to allow a variation of the magnetic field density once the plunger 310 is actuated. Any other direction of movement of the magnet 220 that differs from the direction of the plunger 310 would cause a deviation in the linearity of the sensor signal.

The plunger 310 and the piston 330 are sliding inside an upper (cylindrical) body 320 together with the sleeve 110 that act as magnet holder (the sleeve 110 and the mounting 120 can be one integral part). The sleeve 110 envelops both the plunger 310 and piston 330 and is open for easy assembly, the opening is opposite oriented with respect to the magnet 220. The magnet holder embraces also the cover 130 and slides on it for the complete stroke of the plunger 310. The sleeve 110 cannot rotate as the magnet seat (mounting 220) moves inside a slot 325 of the upper body 320.

The magnet holder is configured to deliver three functions:
- allow smooth sliding of the plunger 110 and Piston 330 inside the upper body 320;
- clamp the magnet 220, move it together with the plunger 310 and avoid transversal movement despite any possible rotation of the plunger 310;
- protect the chamber 230, where both the printed circuit board 250 and the magnet 220 are placed.

The description and drawings merely illustrate the principles of the disclosure. It will thus be appreciated that those skilled in the art will be able to devise various arrangements that, although not explicitly described or shown herein, embody the principles of the disclosure and are included within its scope.

Furthermore, while each embodiment may stand on its own as a separate example, it is to be noted that in other embodiments the defined features can be combined differently, i.e. a particular feature described in one embodiment may also be realized in other embodiments. Such combinations are covered by the disclosure herein unless it is stated that a specific combination is not intended.

THE LIST OF REFERENCE SIGNS IS AS FOLLOWS 110 sleeve
115 protrusion/pin with recess
120 mounting (support) for the magnet
130 cover
135 opening in cover
137 sealing
210 magneto-resistive sensor (e.g. Hall sensor)
220 magnet
230 chamber
240 removable side cover
250 printed circuit board
310 plunger
312 plunger rod
314 piston part of the plunger
320 cylindrical body
322 interior space
325 slot, gap, split-like opening
330 piston
340 sealing
M linear displacement

The invention claimed is:

1. A magnet holder and stroke sensor arrangement, comprising:
a tubular/cylindrical sleeve for enveloping a plunger of the stroke sensor, wherein the stroke sensor includes a magneto-resistive sensor with a magnet and being configured to sense a linear displacement of the plunger in a cylindrical body of a plunger arrangement, wherein the plunger includes a broadened piston portion enveloped by the tubular/cylindrical sleeve and a rod portion protruding from the tubular/cylindrical sleeve;
a mounting for the magnet, which radially protrudes from the tubular/cylindrical sleeve; and
a cover for closing the tubular/cylindrical sleeve on one side including an opening for allowing the linear displacement of the plunger therethrough,
wherein the tubular/cylindrical sleeve and the cover move relative to each other, when the plunger performs the linear displacement in the cylindrical body, wherein one or more sealing elements are formed between the cover and the plunger to provide a sealing during the linear motion.

2. The magnet holder and stroke sensor arrangement of claim 1, wherein the plunger arrangement includes a piston configured to move together with the plunger inside the cylindrical body, and wherein the tubular/cylindrical sleeve is formed to envelope at least an upper portion of the piston.

3. The magnet holder and stroke sensor arrangement of claim 1, wherein the plunger performs the linear displacement and/or a rotation relative to the cylindrical body, and wherein the mounting is configured to provide a rotational interlock between the tubular/cylindrical sleeve and the cylindrical body, while allowing the linear displacement within the cylindrical body.

4. The magnet holder and stroke sensor arrangement of claim 2, wherein the tubular/cylindrical sleeve is adapted to perform the linear displacement together with the plunger and/or the piston.

5. A stroke sensor, comprising:
a magneto-resistive sensor with a magnet to sense a linear displacement of a plunger in a cylindrical body of a plunger arrangement; and
a magnet holder, including:
a tubular/cylindrical sleeve for enveloping the plunger of the stroke sensor, wherein the plunger includes a broadened piston portion enveloped by the tubular/cylindrical sleeve and a rod portion protruding from the tubular/cylindrical sleeve;
a mounting for the magnet, which radially protrudes from the tubular/cylindrical sleeve; and
a cover for closing the tubular/cylindrical sleeve on one side, including an opening for allowing the linear displacement of the plunger therethrough;
wherein the tubular/cylindrical sleeve and the cover move relative to each other, when the plunger performs the linear displacement in the cylindrical body, wherein one or more sealing elements are formed between the cover and the plunger to provide a sealing during the linear motion.

6. The stroke sensor of claim 5, further comprising:
a chamber arranged at a side portion of the cylindrical body sealed from an interior space of the cylindrical body; and
a removable side cover providing a closure for the chamber, wherein the magneto-resistive sensor is arranged together with its magnet inside the chamber.

7. The stroke sensor of claim 6, further comprising:
a printed circuit board attached to the removable side cover and adapted to hold the magneto-resistive sensor in the chamber.

8. The stroke sensor of claim 6, wherein the cover is adapted to close the cylindrical body and the chamber.

9. A plunger arrangement for a brake system of a vehicle, comprising:
a plunger;

a cylindrical body within which the plunger performs a linear displacement; and a stroke sensor to generate a sensor signal depending on the linear displacement;

wherein the stroke sensor includes:
- a magneto-resistive sensor with a magnet to sense a linear displacement of a plunger in a cylindrical body of a plunger arrangement; and
- a magnet holder, including:
  - a tubular/cylindrical sleeve for enveloping the plunger of the stroke sensor, wherein the plunger includes a broadened piston portion enveloped by the tubular/cylindrical sleeve and a rod portion protruding from the tubular/cylindrical sleeve;
  - a mounting for the magnet, which radially protrudes from the tubular/cylindrical sleeve; and
  - a cover for closing the tubular/cylindrical sleeve on one side, including an opening for allowing the linear displacement of the plunger therethrough;
  - wherein the tubular/cylindrical sleeve and the cover move relative to each other, when the plunger performs the linear displacement in the cylindrical body, wherein one or more sealing elements are formed between the cover and the plunger to provide a sealing during the linear motion.

10. The plunger arrangement of claim 9, wherein the cylindrical body includes an axial slot for receiving part of the mounting to provide an axial guidance for the tubular/cylindrical sleeve while preventing relative rotations between the tubular/cylindrical sleeve and the cylindrical body.

11. The plunger arrangement of claim 9, further comprising:
- a piston to move in at least one direction together with the plunger inside the cylindrical body, wherein the tubular/cylindrical sleeve is adapted to slide inside the cylindrical body and to encircle at least an upper portion of piston; and
- a sealing between a lower portion of the piston and the cylindrical body to seal the chamber from an interior space of the cylindrical body.

12. A vehicle, comprising:
a plunger arrangement for a brake system of the vehicle, including:
- a plunger;
- a cylindrical body within which the plunger performs a linear displacement; and
- a stroke sensor to generate a sensor signal depending on the linear displacement;

wherein the stroke sensor includes:
- a magneto-resistive sensor with a magnet to sense a linear displacement of a plunger in a cylindrical body of a plunger arrangement; and
- a magnet holder, including:
  - a tubular/cylindrical sleeve for enveloping the plunger of the stroke sensor, wherein the plunger includes a broadened piston portion enveloped by the tubular/cylindrical sleeve and a rod portion protruding from the tubular/cylindrical sleeve;
  - a mounting for the magnet, which radially protrudes from the tubular/cylindrical sleeve; and
  - a cover for closing the tubular/cylindrical sleeve on one side, including an opening for allowing the linear displacement of the plunger therethrough;
  - wherein the tubular/cylindrical sleeve and the cover move relative to each other, when the plunger performs the linear displacement in the cylindrical body, wherein one or more sealing elements are formed between the cover and the plunger to provide a sealing during the linear motion.

13. The stroke sensor of claim 5, wherein the magneto-resistive sensor uses a Hall effect to operate as a Hall sensor.

* * * * *